United States Patent Office 3,499,039
Patented Mar. 3, 1970

3,499,039
PREPARATION OF TERTIARY PHOSPHINES
Hans Joachim Lorenz, Bensheim-Auerbach, Bergstrasse, Alfons Robert Zintl, Kelheim (Danube), and Volker Franzen, Heidelberg, Germany, assignors to Deutsche Advance Produktion GmbH, Lautern, Odenwald, Germany
No Drawing. Filed Nov. 10, 1966, Ser. No. 593,266
Int. Cl. C07f 9/28
U.S. Cl. 260—606.5                         5 Claims

ABSTRACT OF THE DISCLOSURE

In accordance with certain of its aspects, the process of this invention for preparing trihydrocarbyl phosphines comprise reacting at a temperature of −70 to +80° C. in an organic solution, a phosphorus halide selected from the group consisting of $PX_3$, $RPX_2$ and $R_2PX$, wherein R is hydrocarbon and X is halogen, with a Grignard compound in a proportion of 1 mole of said Grignard compound per 0.8 to 1.1 moles of said X, dissolving the magnesium halide precipitated in said reaction to an aqueous acidic phase having a pH below 6, the acidity of said phase being produced by an excess of ions of said X, adding a base selected from the group consisting of ammonia and organic amines so as to adjust the pH of said phase to at least 6.0, separating said aqueous phase from the organic solvent phase, and recovering the phosphine from the phase containing the same.

This invention relates to the preparation of phosphines.

It is well known to prepare phosphines by the reaction of phosphorous trihalides with a Grignard reagent in an organic solvent. The reaction mixture is hydrolyzed, separating it into an aqueous and organic phase, and the phosphine is separated from the organic phase by distillation. The obtained phosphine yields are generally not good, and it has been frequently proposed to apply a considerable excess of the Grignard reagent to improve the yield. Still, the yields remained unsatisfactory.

It is, therefore, a principal object of the invention to provide an improved method for the production of phosphines.

Other objects and advantages will be apparent from a consideration of the specification and claims.

It has been found that excellent yields are obtained when the separation of the Grignard reagent-phosphorus (3)-halide reaction products is carried out in a novel manner. Thereby, it is a further advantage that it becomes also possible to operate with substantially stoichiometric amounts of the reactants.

The present process for producing phosphines comprises reacting a substituted or unsubstituted hydrocarbon magnesium halide with a phosphorus (3)-halide and adding to the reaction products either water in such a small amount as not to develop an aqueous phase or, if an aqueous phase is to be formed, to use water containing ions of the used halide in form of the acid or an acid salt.

Phosphines of the composition $R_aR_bR_cPX_n$ are prepared by reacting a halide of three-valent phosphorus of the group consisting of $PX_3$, $R_aPX_2$ and $R_aR_bPX$ with a Grignard compound of the formula $R_yMgX$. In said formulae, the R groups are hydrocarbons which may be substituted and may contain, e.g., hetero atoms, such as oxygen in ether linkage. The R groups may be the same or different and may be linear or branched alkyl, alkenyl, alkinyl, aralkyl, aryl, alkaryl, cycloalkyl or other radicals. X is halogen, particularly chlorine, but also bromine or iodine but except fluorine. n is 3-(a+b+c), and an integer between 0 and 2; a is an integer from 1 to 3, b from 0 to 2, and c from 0 to 1. $R_y$ is a member of the group consisting of $R_a$, $R_b$, and $R_c$.

In carrying out the process, 1 mole of the Grignard compound is employed for 0.8 to 1.1, preferably 1 to 1.1 moles of halogen bound to phosphorus, and the reaction is carried out under an inert protecting gas, e.g., nitrogen, in a conventional solvent for Grignard reactions. Such solvents are, e.g., diethyl ether, diisopropyl ether, dibutyl ether, tetrahydrofuran, dioxane, or aliphatic or aromatic hydrocarbons, which may be employed in mixture with an ether or other solvent.

Instead of the hydrocarbon magnesium halide, also its organic complex compounds can be used.

The phosphorus halide, which may be diluted with a solvent, is added to the Grignard compound at a temperature between −70 and +80, preferably between −10 and +30° C., and the reaction mixture, if necessary, is subsequently maintained for some time at a temperature between +10° C. and the boiling point.

The reaction mixture is then processed for the recovery of the phosphine. In a first embodiment of the invention, there is added to the reaction mixture at a temperature between −10 and +50° C. an aqueous solution containing the halide ion involved in form of the acid of the respective hydrohalide or its ammonium or amine salt; when a magnesium chloride Grignard is used, hydrochloric acid, or an ammonium chloride solution, will be used in an amount sufficient to dissolve the entire precipitate whereby a pH below 6 (but not below 1) has to be obtained. Then, a base, preferably ammonia or an amine, is added to adjust the pH to at least 6.0. The aqueous phase is then separated, and the organic phase is dried and subjected to fractionated distillation to recover the phosphine.

If the obtained phosphine is soluble in aqueous hydrogen halide, e.g., in hydrochloric acid, aqueous hydrochloric acid may be added to the reaction mixture in such an amount as to obtain the phosphine completely dissolved in the aqueous phase. After separation of the organic phase from the aqueous phase, the latter is then adjusted, by addition of ammonia or amine as set forth above, to a pH of at least 6.0 so as to separate the phosphine, which can then be recovered and rectified.

Instead of dissolving the precipitate or both the precipitate and phosphine, to an aqueous solution and separate the aqueous phase from the organic phase, it is also possible to leave the precipitate undissolved and only to improve its filterability by adding water in an amount just sufficient to convert the precipitate to a readily filtered grain aggregate. Generally, this requires about 7 moles of water per 1 mole of Grignard compound employed. After filtration, a clear organic phase remains from which the phosphine is obtained by fractionated distillation.

The following examples are given to illustrate the invention but are not to be understood as limiting the invention. The yields relate to gas chromatographically pure products. The reactions were always carried out under nitrogen.

EXAMPLE 1

To 108 g. (0.92 mole) of butylmagnesium chloride, dissolved in 425 ccm. of dibutyl ether, there were slowly dropwise added at a temperature of −5° C., 45.8 g. (0.33 mole) of phosphorus trichloride, dissolved in 150 cc. of dibutyl ether. After the addition of the phosphorus trichloride was completed, the mixture was heated for 30 minutes at 65° C. and then cooled to room temperature.

To said mixture, there were added first 400 cc. of water which were sufficient to dissolve the precipitate, then 200 cc. of 2 N hydrochloric acid, and finally 2 N aqueous ammonia until the aqueous phase had ammoniacal reaction.

The ether phase was separated, dried, and distilled. There were obtained 60.2 g. of tributyl phosphine ($b_{0.01}$ 55° C.), corresponding to a yield of 96.8 percent, calculated on the Grignard compound.

EXAMPLE 2

Under the same conditions as set forth in Example 1, 1.05 moles of $PCl_3$ were reacted with 3 moles of octylmagnesium chloride. The yield of trioctyl phosphine was 87.1 percent, calculated on the Grignard compound, and 82.9 percent, calculated on the $PCl_3$.

EXAMPLE 3

As described in the preceding examples, 111 g. (1.08 moles) of isopropylmagnesium chloride, dissolved in 800 cc. of diisopropyl ether, were reacted at —5° C. with 49.5 g. (0.36 mole) of phosphorus trichloride, dissolved in 125 cc. of isopropyl ether. After completed addition of the phosphorus trichloride, the reaction mixture was heated for half an hour at 60° C. and cooled.

Then, 50 cc. of water and 250 cc. of 2 N hydrochloric acid were added to dissolve completely the precipitate, and then the aqueous phase was adjusted to ammoniacal reaction with about 300 cc. of 2 N aqeous ammonia solution.

The separated ethereal phase was distilled and yielded 33 g. of triisopropyl phosphine, which had a boiling point of 64° C. at 12 mm. Hg.

EXAMPLES 4–12

A number of phosphines was prepared as described in Example 3. The reactants, reaction products, and yields are given in the following table. The solvent was dibutyl ether, except in Examples 6, 7, and 9, where diethyl ether was used.

TABLE

| Ex. | Phosphine | Mole ratio | Yield in percent calculated on $PCl^3$ | Yield in percent calculated on RMgCl |
|---|---|---|---|---|
| 4 | Triethylphosphine | 1:3 | 78.3 | 78.3 |
| 5 | Dioctylbutylphosphine | *1:2 | 82.5 | 82.5 |
| 6 | Triallylphosphine | 1:3 | 57.4 | 57.4 |
| 7 | Tribenzylphosphine | 1:3 | 80.5 | 80.5 |
| 8 | Dibutylphenylphosphine | **1:2 | 90.6 | 90.6 |
| 9 | Triphenylphosphine | 1:3 | 84.3 | 84.3 |
| 10 | Tricyclopentylphosphine | 1:3 | 68.2 | 68.2 |
| 11 | Tricyclohexylphosphine | 1:3 | 70.8 | 70.8 |
| 12 | Tris-(2-ethylhexyl)-phosphine | 1:3 | 84.8 | 84.8 |

*Butyldichlorophosphine.
**Phenyldichlorophosphine.

EXAMPLE 13

11.2 kg. of phosphorus trichloride were dissolved in 22.5 kg. of dibutyl ether and added with stirring within 3½ hours to 116 kg. of a 22.5% solution of butylmagnesium chloride in dibutyl ether, whereby the temperature was maintained at —5° C.

Subsequently, the reaction mixture was stirred for ½ hour at 65–70° C. and then cooled to room temperature. After cooling, 95 liters of 5% aqueous hydrochloric acid were added, whereby at the beginning cooling with water was necessary.

The pH of the aqueous phase was 4.0; subsequently, it was adjusted to 7.5 by addition of 43 liters of a 3.5% aqueous ammonia solution.

The ether phase was then separated; it weight was 124 kg. On distillation, 14.4 kg. of tributyl phosphine were obtained therefrom, corresponding to a yield of 94 percent, calculated on the butylmagnesium chloride, and 87 percent, calculated on phosphines trichloride.

EXAMPLE 14

As described in Example 1, 117 g. (1.14 moles) of isopropylmagnesium chloride, dissolved in 710 cc. of isopropyl ether, were reacted with 52 g. (0.33 mole) of phosphorus trichloride, dissolved in 150 cc. of isopropyl ether. After heating for 20 minutes at 60° C., 400 cc. of 2 N hydrochloric acid were added which were sufficient to dissolve not only the magnesium chloride precipitate but also the phosphine in the aqueous phase.

The aqueous phase was separated, and the raw phosphine was separated in said phase by adding 500 cc. of 2 N aqueous ammonia solution. Distillation of the raw phosphine produced 34.4 g. of pure triisopropyl phosphine, corresponding to a yield of 56.6 percent.

EXAMPLE 15

To 116.5 g. (1.0 mole) of butylmagnesium chloride, dissolved in 425 cc. of dibutyl ether, there were added slowly and dropwise at —5° C. 45 g. (0.33 mole) of phosphorus trichloride, dissolved in 150 cc. of dibutyl ether. After the entire amount of the phosphorus trichloride had been added, the reaction mixture was heated for 30 minutes at 65° C. and cooled to the ambient temperature. The water was added in an amount just sufficient to convert the precipitated magnesium chloride to a coarse grain structure which settled readily when agitation of the solution was discontinued. The required amount of water was about 125 cc.

The precipitate was filtered off and the remaining organic phase was distilled. There were obtained 58.1 g. of tributyl phosphine ($b_{0.01}$ 56° C.), corresponding to 86.6 percent of theory, calculated on the Grignard compound.

EXAMPLE 16

This example was carried out as the preceding example with this sole modification that 113.5 g. (0.97 mole) of butylmagnesium chloride were reacted with 48.3 g. (0.35 mole of phosphorus trichloride, corresponding to a $PCl_3$ excess of 8.5 percent.

The yield was 61.5 g. of tributyl phosphine, corresponding to 94.3% of theory, calculated on the Grignard compound, or 87.0 percent, calculated on phosphorus trichloride.

We claim:

1. A process for preparing tertiary phosphines of the formula $R_aR_bR_cP[X_n]$ wherein R are hydrocarbon groups, $a$ is an integer from 0 to 3, $b$ from 0 to 2, $c$ from 0 to 1, and $a+b+c=3$, comprising reacting at a temperature of —70 to +80° C. in an organic solution, a phosphorus halide selected from the group consisting of $PX_3$, $RPX_2$, and $R_2PX$, wherein R is hydrocarbon and X is an halogen selected from the group consisting of chlorine, bromine and iodine with a Grignard compound in a proportion of 1 mole of said Grignard compound per 0.8 to 1.1 moles of said X, dissolving the magnesium halide precipitated in said reaction to an aqueous acidic phase having a pH below 6, the acidity of said phase being produced by an excess of ions of said X, adding a base selected from the group consisting of ammonia and organic amines so as to adjust the pH of said phase to at least 6.0, separating said aqueous phase from the organic solvent phase, and recovering the phosphine from the phase containing the same.

2. The process as claimed in claim 1 comprising adding to the reaction mixture containing phosphine and precipitated magnesium halide, aqueous HX in such an amount as not to dissolve the produced phosphine, and to leave said phosphine in the organic phase, and subjecting said organic phase to fractionated distillation.

3. The process as claimed in claim 1 comprising adding to the reaction mixture containing phosphine and precipitated magnesium halide, aqueous HX in an amount sufficient to dissolve said magnesium halide and phosphine, and recovering said phosphine from the aqueous phase.

4. The process as claimed in claim 1 wherein the reactions are carried out in an inert gas atmosphere.

5. The process as claimed in claim 1 wherein the phosphorus halide is added to the Grignard compound.

References Cited

UNITED STATES PATENTS 3,414,625  12/1968  Natoli et al. _____ 260—429.7

OTHER REFERENCES

Houben-Weyl, Methoden Der Organischen Chemie, vol. XII/1 (1963), pages 33 to 55.

OSCAR R. VERTIZ, Primary Examiner

W. F. W. BELLAMY, Assistant Examiner